July 6, 1948.

F. M. CLARK 2,444,766

METHOD OF PREPARING INSULATING
AND DIELECTRIC MATERIALS
Filed June 7, 1946

Inventor:
Frank M. Clark,
by Harry E. Dunham
His Attorney.

Patented July 6, 1948

2,444,766

UNITED STATES PATENT OFFICE 2,444,766

METHOD OF PREPARING INSULATING AND DIELECTRIC MATERIALS

Frank M. Clark, Pittsfield, Mass., assignor to General Electric Company, a corporation of New York Application June 7, 1946, Serial No. 675,271

5 Claims. (Cl. 18—47.5)

The present invention comprises a method of preparing electric insulating and dielectric elements consisting mainly of ferric phosphate. Such elements are products made by heat-compacting finely divided particles of such phosphate under pressure. The properties of such synthetic elements render them adaptable for a wide variety of uses, for example as dielectric members or as insulators in electric capacitors, transformers, switch gear apparatus and cables. Because of their low dielectric loss in high frequency circuits, these elements are suited particularly for incorporation into high frequency apparatus.

Figure 1:
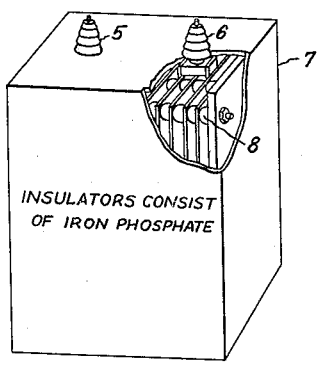
Figure 2:
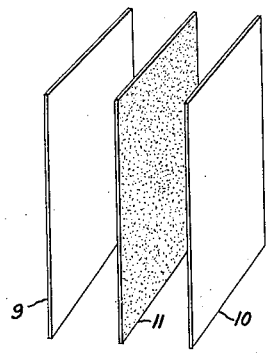
Figure 3:
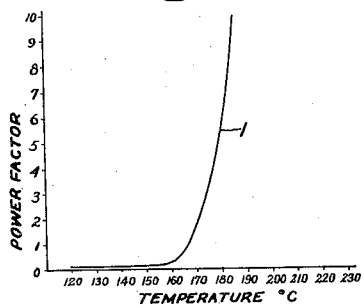
Figure 4:
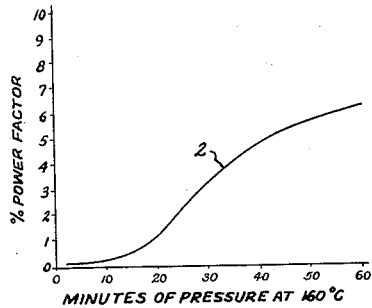
Figure 5:
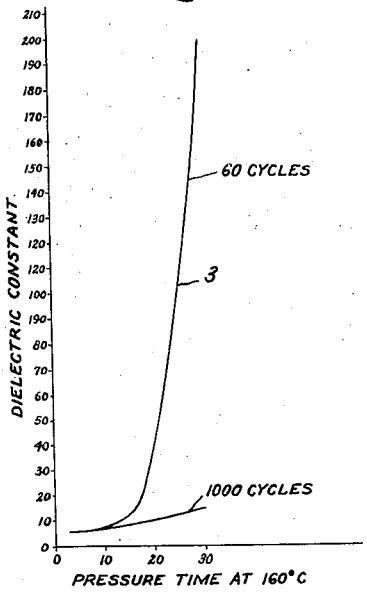
Figure 6:
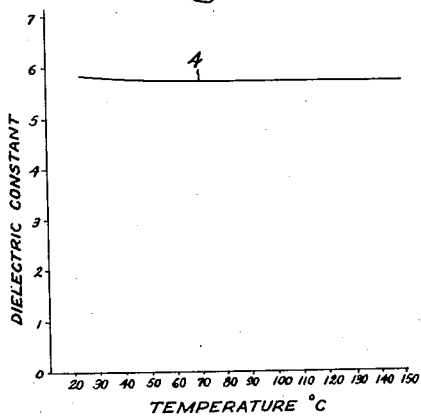

The novel features of my invention will be pointed out in the appended claims and described with particularity in the following specification taken in connection with the accompanying drawing. Figs. 1 and 2 respectively represent conventionally capacitor structures embodying the invention; Figs. 3 and 4 are graphs showing respectively the relation of power factor to molding temperature and molding pressure, and Figs. 5 and 6 are graphs showing respectively the relation of dielectric constant to molding conditions.

In carrying out the fabrication of products embodying my invention, particles of a suitable phosphate of iron, as for example a comminuted ferric phosphate, are compacted with or without a binder into desired form. Ferric phosphate which has been comminuted to a size corresponding to about 80 to 300 mesh screen openings may be compacted, with or without a binder, at a pressure of approximately 10,000 pounds per square inch at a temperature of about 130 to 200 C., the molding time varying inversely with the temperature within the limits of about two to thirty minutes. For some types of moldings it is desirable to associate a suitable bond with the iron phosphate. The bond may consist of organic material such as cellulose acetate, vinyl acetate, styrene, octachlor diphenyl benzene, and monoisoamyl phosphate. Alternatively an inorganic bond, such as sodium silicate, sodium borate, or ferric oxide may be mixed with the phosphate particles. The amount of binding agent may vary, five per cent ordinarily being satisfactory.

The temperature at which the heat-compacting operation is carried out has a marked effect on the dielectric constant and power factor of the product. A ferrous phosphate or complex ferric phosphate hydrate composition which appears as a green scale or glaze on the surface of the pressed insulator appears to have an important effect. The formation of this green glaze is accompanied by an increase in dielectric loss which is measured as power factor. When the insulator is formed at temperatures of about 150° C. and below, the formation of this undesired green compound is not observed even after long continuation of the pressure.

The power factor values plotted in Fig. 3 and Fig. 4 is applied for high frequency current of about 1000 kilocycles and was measured at 25° C. As indicated by graph 1 of Fig. 3 the power factor rises sharply when the temperature of molding is above about 160° C. At higher temperatures, the green compound formation appears; the higher the temperature the shorter the pressure period resulting in its formation. This is indicated in the following table of time leading to formation of the green compound;

| Temp., ° C. | Approximate time |
|---|---|
| | Minutes |
| 160 | 15 |
| 185 | 5 |
| 200 | 2 |
| 230 | 1 |

Since the formation of this green glaze is accompanied by undesired increase of power factor, I prefer to prepare the elements by pressure application at about 150 to 160° C. for a period of time not exceeding about 10 minutes.

Graph 2 of Fig. 4 illustrates the increase in power factor which results from the application of excessive continuance of molding pressure during fabrication of an iron phosphate insulator. Continuation of molding pressure for more than about ten minutes, as shown by the graphs of Fig. 5, results in an increase of dielectric constant. I prefer to employ a pressure of about 10,000 pounds per square inch applied for about ten minutes at a temperature of about 160° C.

When properly pressed with regard to temperature and time, the dielectric stability of insulating elements is not effected by subsequent application of the order of 150 to 175° C. temperatures. Elements which have been improperly prepared and are characterized by high power factor and possess the green glaze already referred to can be improved by the application of a firing treatment after being removed from the high temperature press. This is illustrated in the following results:

| Treatment | Power factor (25° C.) |
|---|---|
| After pressing at 160° C. for 60 minutes | Per cent 6.3 |
| After firing at 400° C. for 3 hours | .3 |
| After pressing at 160° C. for 30 minutes | 3.3 |
| After firing at 400° C. for 3 hours | .25 |

When properly prepared by pressing for a suitable time and at a suitable temperature and pressure to compact the comminuted particles (for example 10,000 pounds per square inch), and firing at 400° C. for a period of from ¼ to 6 hours (the time may be extended indefinitely) the dielectric constant of the present products are not greatly affected by wide changes in temperature. This property has been indicated by graph 4 of Fig. 6. Elements prepared by a pressure of 10,000 pounds per square inch at 160° C. for 10 minutes had a power factor of .15% at 25°C. At 75° C. the power factor was .20% which was maintained even at a temperature of 150° C.

Elements which had been "over-pressed" by the application of 10,000 pounds per square inch at 160° C. for 60 minutes had a power factor of 6.3% which after having been fired at 400° C. for 3 hours dropped to .3%. These elements showed equally good stability over wide ranges of temperature. After firing at 400° C. the dielectric losses at different temperatures were as follows:

*Power factor*

.3% (25° C.)
.31% (75° C.)
.35% (150° C.)

The manufacturing procedure therefore includes the step during which the pressed element is fired at 400° C. for a period which may range from ¼ hour to as much as 16 hours or longer. Preferably, the elements are fired for about 3 hours.

The insulating products of the present invention are not susceptible to rapid deterioration when exposed to moist air. Thus an element prepared by pressure and firing as described was substantially unchanged dielectrically when exposed to air at 65% relative humidity for one week.

| | Per cent |
|---|---|
| Initial power factor | .28 |
| After exposure | .27 |

Exposed to room air for a period of 12 days showed no effect.

| | Per cent |
|---|---|
| Original power factor | .23 |
| After exposure | .24 |

The iron phosphate products hereof possess good resistance when tested under unidirectional voltage. The megohm resistance is approximately 180,000 megohms per mil of thickness.

They possess a dielectric constant of about 5.5 to 6.0 when properly prepared and fired as described. This dielectric constant is substantially constant over wide range of temperature. This is shown in Fig. 6.

The constancy in power factor and in dielectric constant distinguishes the present products from other "ceramic" insulators commonly used for dielectric circuits which customarily are characterized by a marked decrease in capacity and increase in power factor over the temperature range from 25 to 150° C.

Where for low voltage 60 cycle application, a high dielectric constant is desired, high values may be obtained by the use of what may be termed "excess treatment." This is illustrated in Fig. 5 which shows that an iron phosphate dielectric element when pressed at 160° C. for 30 minutes has a dielectric constant measured at 1000 kilocycles will be as high as 13.5. At 60 cycles exceptionally high dielectric constants up to 200 or more are produced as indicated by graph 3. The fact that this high dielectric constant is accompanied by an increased power factor does not affect the usefulness of these new elements since they are capable of high temperature operation without thermal destruction. This of course is in contrast to the behavior of the usual organic insulation.

Articles embodying my invention may be used as insulators 5, 6 for the external terminals of a high frequency capacitor 7, or as internal spacing elements 8 between the capacitor armatures 9, 10.

In some cases where a thin sheet dielectric element embodying my invention is desired, iron phosphate may be pressed in sheet form in combination with a support or skeleton. For this purpose, the skeleton or support may consist of asbestos or paper. I prefer however to use a support made of glass cloth or matted glass fibre. The comminuted iron phosphate is applied to the support as a powder or may be applied as a gel prepared by the reaction between ferric chloride solution and calcium phosphate solution, the product later being dialyzed to eliminate chloride contamination. After deposition on the support, the iron phosphate is dried by passing through an air oven at a temperature of about 150° C. The support and applied phosphate are pressed by passing between heated rollers under pressure of 10,000 pounds per square inch or more, a temperature of 160° C. being satisfactory.

Sheet material so prepared is capable of use in capacitors as flat dielectric sheets as indicated in Fig. 2 in which the armatures 9, 10 and the dielectric spacer 11 are indicated conventionally.

What I claim as new and desire to secure by Letters Patent of the United States, is:

1. The method of molding iron phosphate particles to a coherent state which consists in subjecting said particles to pressure at a temperature at least as high as about 140° C. for a length of time not materially exceeding ten minutes.

2. The method of preparing an electric insulator which consists in subjecting particles of ferric phosphate to a pressure of about 10,000 pounds per square inch at a temperature within the range of 130 to 200° C. for a period of about 2 to 30 minutes, the duration of pressing varying inversely with the temperature.

3. The method of preparing an electric insulator which consists in subjecting a mass of particles of ferric phosphate having a size corresponding to about 80 to 300 mesh screen openings, during a period of about ten minutes to a pressure of about 10,000 pounds per square inch while at a temperature of about 160° C.

4. The method of preparing an electric insulator from ferric phosphate which consists in comminuting said phosphate to a particle size corresponding to a screen opening size of about 80 to 300 mesh, confining a mass of said particles in a mold, heating to a temperature of about 130 to 200° C. and subjecting said particles to a pressure of about 10,000 pounds per square inch of pressure application for about 2 to 30 minutes, the duration of pressure application varying inversely with the temperature.

5. The method of preparing an electric insulator which consists in subjecting particles of ferric phosphate to a pressure of about 10,000 pounds per square inch at a temperature within the range of 130 to 200° C. for a period of about 2 to 30 minutes, the duration of pressing varying inversely with the temperature and thereafter heating to a temperature of about 400° C. for about ¼ to 6 hours.

FRANK M. CLARK.

REFERENCES CITED

The following references are of record in the file of this patent:

UNITED STATES PATENTS

| Number | Name | Date |
| --- | --- | --- |
| 2,227,928 | Drucker | Jan. 7, 1941 |